2,957,084
Patented Oct. 18, 1960

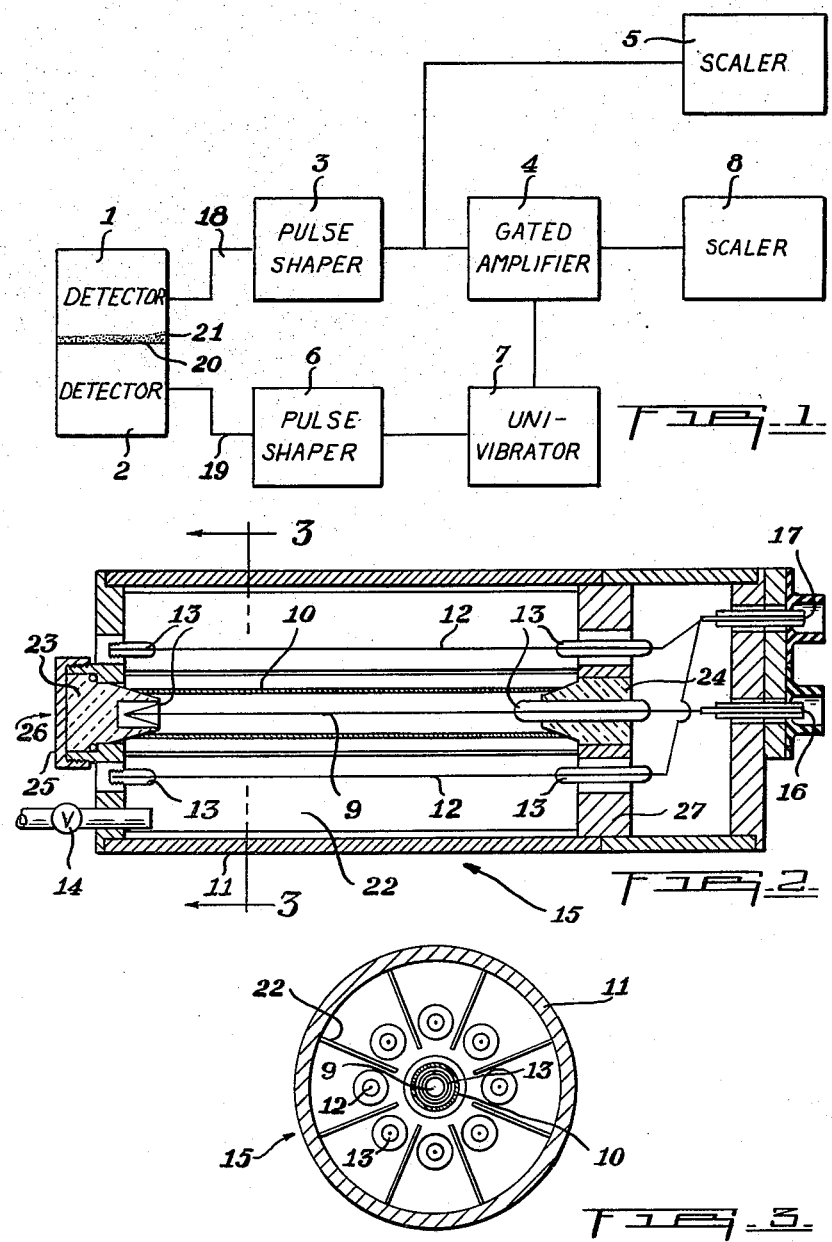

2,957,084
ALPHA AIR MONITOR

John Douglas Marr and William Gunn Cross, Deep River, Ontario, Canada, assignors to Atomic Energy of Canada Limited, Ottawa, Ontario, Canada Filed Apr. 20, 1956, Ser. No. 579,513

10 Claims. (Cl. 250—83.6)

The present invention relates to counting radiation from long-lived alpha-emitters in the presence of radiation from short-lived alpha-emitters where the radiation of each alpha particle from the short-lived emitters is immediately preceded by the radiation of a beta particle.

Absorption into the human body of extremely small quantities of long-lived alpha-active elements such as plutonium, radium or uranium, by breathing air contaminated with these substances, constitutes a serious hazard to health. Under normal conditions beta and short-lived alpha-active elements, such as radon or thoron and their decay products, are present in the atmosphere in much larger concentrations than the hazardous long-lived alpha-emitters. Radon concentration in the air varies widely with the time of day and weather conditions.

One of the present methods of measuring alpha radiation from long-lived alpha-emitters in the presence of alpha and beta radiations from short-lived emitters involves: collecting the radio-active dust from a known volume of air, by means of an electrostatic precipitator or a filter paper, and inserting the sample into a suitable alpha-radiation counter of the Geiger-Mueller type. Counts due to short-lived alpha activity are avoided by waiting several hours for the short-lived emitters to decay to a negligible value. When the short-lived emitters are decay products of the element radon, this waiting period is about six hours. When a high concentration of thoron decay products constitutes the short-lived emitters, then a waiting period of several days is required. These waiting periods make early warning of a hazardous condition impossible.

Another method, which is a modification of the method described above, may be used when the short-lived emitters are of one type, such as the decay products of radon. In the case of radon decay products, this involves taking the first count immediately after sample collection, and a second count is taken 48 minutes later. The activity of the radon decay products will have decreased by a factor of two at the time of the second count. Consequently, by the use of simultaneous equations, it is possible to calculate the counts due to radon decay products in the first count, the remaining number of counts are then classified as long-lived alpha counts. This method of measurement requires a total time of approximately 70 minutes. When this method is used the time of measurement is reduced considerably but large errors are introduced by normal statistical counting deviations. These large errors often make the detection of a tolerance level of long-lived alpha-emitters impossible.

An alternative method may be used when all the short-lived emitters are decay products of a single element. This method consists of measuring the ratio of beta activity to the alpha activity in a sample of dust collected from a known volume of air. This ratio is known for such elements as radon and its decay products, and deviations observed from this value indicate the presence of other activity in the sample.

In some cases the radiation of each alpha particle is immediately preceded by the radiation of a beta particle. For example, in the case of the decay products of radon, the radiation of each alpha particle from short-lived radium C' is preceded by the radiation of a beta particle from radium C. The present invention makes use of this in overcoming the faults of the known methods of measuring long-lived alpha radiation.

The present invention consists of producing first electrical pulses by detecting the alpha radiation with a first radiation detector; producing second electrical pulses by detecting the beta radiation with a second radiation detector; the first electrical pulses are blocked for a predetermined time following each of the second electrical pulses, and the unblocked first electrical pulses are then counted. A second counting means may be adapted to count all of the first electrical pulses.

According to a preferred embodiment of the invention an alpha radiation filter is positioned between the first radiation detector and the second radiation detector. A sample of radioactive dust, which has been collected from a known volume of air, is deposited on the side of the filter closest to the first radiation detector. The alpha radiation filter may constitute an integral part of at least one of the radiation detectors.

Consequently the first radiation detector is allowed to be bombarded by all of the radiations; the alpha radiations are then filtered out from the beta radiation, and the second radiation detector is allowed to be bombarded by the beta radiation. The first electrical pulses may be amplified, by a suitable conventional electrical amplifier, before they are counted. In this case the amplifier is blocked for a predetermined time following each of the second electrical pulses, and the counting means counts the unblocked pulses.

A conventional univibrator type electronic circuit may constitute the blocking means. In which case this circuit would be adapted to be triggered by each of the second electrical pulses, and the square wave type output of this circuit would be used to block the amplifier for a predetermined time following each of the second electrical pulses. The second electrical pulses may be passed through a conventional pulse shaping circuit before they trigger the univibrator. The first electrical pulses may also be passed through a similar type of pulse shaping circuit before these pulses are amplified. A third counting means may be provided which is adapted to count the second electrical pulses.

The present invention provides a radiation detector tube which comprises a first anode and a first cathode which together constitute a first radiation detector of the Geiger-Mueller type. A second cathode is positioned adjacent to the first cathode and at least one second anode is positioned between the two cathodes. The two cathodes and the second anode constitute a second radiation detector of the Geiger-Mueller type. The first radiation detector is preferably an alpha radiation detector, and the second radiation detector is preferably a beta radiation detector.

The first cathode may be constructed to constitute an alpha radiation filter or screen. This cathode may be constructed of aluminum having a thickness of approximately 0.0008 inch. The first cathode may be removable from the detector tube to facilitate the depositing of radioactive dust on one side thereof. A plurality of fins may be positioned adjacent the second anodes, in which case the fins are electrically connected to at least one of the cathodes.

The term "Geiger-Mueller tube" as used in this specification and appended claims includes proportional and scintillation types of counter tubes.

A preferred embodiment of the invention will now be discussed with reference to the attached drawings, in which:

Figure 1 is a block diagram type schematic circuit illustrating a preferred embodiment of the invention, Figure 2 is a sectional view illustrating a preferred embodiment of the radiation detectors, and Figure 3 is a cross-sectional view taken on the line 3—3 of Figure 2.

An apparatus for counting radiation from long-lived alpha emitters in the presence of radiation from short-lived alpha-emitters where the radiation of each alpha particle from the short-lived emitters is immediately preceded by the radiation of a beta particle, is illustrated in Figure 1 of the drawings. Referring now to this figure, an alpha radiation filter 20 is placed between the two detectors 1 and 2 and forms an integral part of both these radiation detectors. A sample of radioactive dust is deposited by an electrostatic precipitator on the side of the filter 20 which is closest to the radiation detector 1. This radioactive dust consists of long-lived and short-lived emitters. The long-lived emitters are alpha radiation emitters. The short-lived emitters emit both beta and alpha radiations. The first and second radiation detectors are illustrated by the blocks 1 and 2 respectively. The alpha radiation bombards the alpha radiation detector 1, which is of the Geiger-Mueller type, and first electrical pulses are thereby produced representing the alpha radiation. The beta radiation bombards the radiation detector 2 and thereby produces second electrical pulses. The electrical pulses from the radiation detector 1, after suitable amplification and squaring by a pulse shaper network 3, are passed to an amplifier 4. A scaler 5 counts the first electrical pulses originating at the detector 1.

Each of the electrical pulses from the radiation detector 2, after suitable amplification and squaring by a pulse shaper network 6, triggers a univibrator type circuit 7. The univibrator 7 produces a pulse of approximately one milli-second duration, and this pulse is used to block the amplifier 4. Consequently, the electrical pulses originating in the radiation detector 1, which follow an electrical pulse originating in the radiation detector 2 within one milli-second, will not pass through amplifier 4. The amplifier 4 amplifies the remaining pulses from the radiation detector 1, and a scaler 8 counts these remaining amplified pulses.

When radon and its decay products are the predominant radioactive emitters, a few minutes after the collection of the radioactive dust practically all of the short-lived alpha activity is due to radium C', which has a half life of approximately one seventh of a milli-second. In this case there is about a 99% chance that each of the counts due to alpha particles from the short-lived radium C' will be preceded by the radiation of a beta particle within one milli-second. Alpha particles which are not preceded by a beta particle within one milli-second will be counted by the scaler 8. If all of the beta particles were detected by the beta radiation detector 2, there would then be about a 99% chance that the short-lived alpha radiation would be blocked in the above way. However, the apparatus illustrated in the drawings will not accomplish 100% detection of the beta particles. Consequently, a small fraction of the pulses produced by the detection of the short-lived alpha particles by the detector 1 will not be blocked in the amplifier 4, and will appear as long-lived alpha counts on the scaler 8.

In addition, alpha particles from long-lived emitters detected by the alpha radiation detector 1, which are preceded within one milli-second by the detection of a beta particle by the beta radiation detector 2, will not be counted by the scaler 8. This loss of alpha counts from long-lived emitters can be corrected, using well known means, if the total number of beta detections is counted with a third scaler (not shown in the drawings). With this correction applied, scaler 8 then sums all of the detections due to long-lived alpha activities, plus the fraction of detections due to alpha radiation from short-lived emitters which are not preceded within one milli-second by the detection of a beta particle. All of the counts summed by the scaler 8 appear as long-lived alpha counts.

The scaler 5 presents information which can be used to correct the error in the counts summed in the scaler 8 (due to failure to count 100% of the beta particles in detector 2). The scaler 5 sums all of the detections due to long and short-lived alpha activities.

The long-lived alpha activity is related to the information provided by the scalers 5 and 8 in the following manner.

$$N = \frac{Y - PX}{1 - P}$$

where:

$N$ = counts per minute due to alpha radiation from long-lived emitters
$Y$ = number of counts per minute by scaler 8
$X$ = number of counts per minute by scaler 5
$P$ = the fraction of detections due to alpha radiations from short-lived emitters not preceded within one milli-second by the detection of a beta particle. (This fraction may be determined by experiment.)

The counts due to alpha radiation from long-lived emitters may be determined manually by the use of the above formula, or the information presented by the scalers 5 and 8 may be fed to an automatic computer which would be adapated to solve this formula.

The time taken to deposit the radioactive dust on the filter and to determine the concentration of long-lived alpha emitters in the above way is approximately ten to fifteen minutes. A tolerance of plutonium 239 (15 disintegrations/cubic meter/minute) can be detected with a radium C' background as high as 500 disintegrations/cubic meter/minute. The decay products of thoron normally present in the atmosphere also produce a short-lived alpha background. This background, however, is normally small in comparison with the radium C' radiation except where large amounts of thoron are present. Even in the latter conditions the method presented here will cancel two-thirds of the decay products of thoron and will allow a measurement of the long-lived alpha activity in from ten to fifteen minutes.

A preferred embodiment of a radiation detector tube 15 for detecting the alpha and beta radiations discussed above is illustrated in Figures 2 and 3. In this detector tube 15 the anode 9 is surrounded coaxially by a cathode 10. The anode 9 and cathode 10 together constitute an alpha radiation detector of the Geiger-Mueller type. The cathode 10 is surrounded co-axially with a second cathode 11, and anodes 12 are positioned between the cathodes 10 and 11. The anodes 12 are all connected electrically in parallel. The cathodes 10 and 11 and the anodes 12 together form a beta radiation detector of the Geiger-Mueller type. A series of fins 22 are positioned adjacent to the anodes 12 and are electrically connected to the cathode 11. These fins 22 increase the efficiency of the beta radiation detector.

The cathode 10 constitutes an alpha radiation filter. The wall of this cylindrical cathode is just thick enough to at least prevent alpha radiation from long-lived emitters from penetrating into the beta radiation detector, but it is thin enough to permit beta radiation to penetrate through to the beta radiation detector. This cathode may be constructed of aluminum where the walls have a thickness of approximately 0.0008 inch. Alternatively, this cathode may be constructed of a filter paper which is made conductive by a colloidal graphite dip.

The anodes 9 and 12 are insulated from the cathodes 10 and 11 by the insulators 13. The cathodes 10 and 11 are electrically connected. The anodes 9 and 12 run parallel to the cylindrical cathodes 10 and 11 in the conventional manner. A mechanical valve 14 is provided on the cathode 11 to facilitate filling the tube 15 with a gas suitable for Geiger or proportional counting. The cathode 10 contains a small hole (not shown) which permits the gas to enter in the region between the cathode 10 and anode 9. When the tube illustrated in Figures 2 and 3 is used in conjunction with the circuit illustrated in Figure 1 the lead 18 of Figure 1 is connected to the terminal 16 illustrated in Figure 2. The lead 19 of Figure 1 will then be connected to the terminal 17 of Figure 3.

The voltages applied to the cathodes 10 and 11 and the anodes 9 and 12 are the conventional voltages used on Geiger or proportional counters. The electronic circuits (that is the two pulse shaping networks 3 and 6, the univibrator 7, the amplifier 4, and the two scalers 5 and 8) are all of conventional design.

When the tube 15 is assembled, the fins 22 are attached to the cathode 11. The chamber ends 26 and 27 are then attached, and the beta counter insulators 13 and anodes 12 are inserted. The anode 9 is then assembled into the alpha counter anode insulator 13 which is sealed into the chamber end 26. The anode wires 9 and 12 are then connected to the terminals 16 and 17. The tube 15 is normally supported in the vertical position. The cone shaped pieces 23 and 24 center and support the cathode 10, the anode 9 is self-supporting.

The cylindrical cathode 10 is removable from the detector tube 15. This is accomplished by removing the screw cap 25, lifting out the cone shaped plug 23, and then lifting out the cylindrical foil tube 10. This foil tube is fairly strong and it may be readily handled with the fingers. When the cathode is in place in the counter, the fins 22 may also support the cathode 10, although this additional support is not necessary. Due to the cheapness and simplicity of the cathode 10, it may be discarded and replaced by a similar foil whenever necessary.

After the radioactive dust from a known volume of air has been deposited on the inside of the cathode 10, the cathode is then replaced in the tube 15. When the foil tube is first placed in the tube 15, the cone 24 will center the foil around one end of the anode 9. The plug 23 is then inserted and will center and steady the upper end of the anode 9, and also the upper end of the cathode 10. The screw cap 25 is then installed.

If a count of the beta radiation is desired a third scaler (not shown in the drawings) may be adapted to count the electrical pulses originating in the detector tube 2. This scaler would be positioned electrically following the detector 2, the pulse shaping circuit 6 or the univibrator 7.

What we claim as our invention is:

1. A radiation counter for counting radiation from long-lived alpha emitters in the presence of alpha radiation from short-lived emitters where the radiation of each alpha particle from the short-lived emitters is immediately preceded by the radiation of a beta particle from the same short-lived emitter comprising a first radiation detector adapted to produce first electrical pulses when triggered by the alpha radiations, a second radiation detector adapted to produce second electrical pulses when triggered by the beta radiation, first counting means for counting the first electrical pulses, and means triggered by each of the second electrical pulses for blocking the counting of the first counting means for a predetermined time following each of the second electrical pulses.

2. A radiation counter as claimed in claim 1 in combination with a second counting means for counting said first electrical pulses.

3. A radiation counter as claimed in claim 2, wherein an alpha radiation filter is positioned between the first radiation detector and the second radiation detector, the radioactive emitters being deposited on the side of the filter closest to the first radiation detector.

4. A radiation counter as claimed in claim 3 wherein the filter constitutes an integral part of at least one of the radiation detectors.

5. A radiation counter as claimed in claim 4 in combination with an electrical amplifier adapted to amplify the first electrical pulses, the amplifier being positioned electrically between said first counting means and said second counting means.

6. A radiation counter as claimed in claim 4 wherein said means for blocking the counting of the first counting means is adapted to block said amplifier for a predetermined time following each of the second electrical pulses.

7. A radiation counter as claimed in claim 6 wherein said means for blocking the counting of the first counting means is a univibrator type electronic circuit.

8. A radiation counter as claimed in claim 7 in combination with a first pulse shaper type electronic circuit, the first pulse shaper circuit being positioned electrically between the first radiation detector and said amplifier.

9. A radiation counter as claimed in claim 8 in combination with a second pulse shaper type electronic circuit, the second pulse shaper circuit being positioned between the second radiation detector and said univibrator type electronic circuit.

10. A radiation counter as claimed in claim 9 in combination with means for counting said second electrical pulses.

References Cited in the file of this patent

UNITED STATES PATENTS

| | | |
|---|---|---|
| 2,445,305 | Hochgesang | July 13, 1948 |
| 2,598,215 | Borkowski et al. | May 27, 1952 |
| 2,724,060 | Scherbatskoy | Nov. 15, 1955 |
| 2,727,154 | Goldsworthy | Dec. 13, 1955 |
| 2,741,709 | Tirico et al. | Apr. 10, 1956 |
| 2,831,121 | Zito | Apr. 15, 1958 |